United States Patent [19]

Young et al.

[11] Patent Number: 4,492,628
[45] Date of Patent: Jan. 8, 1985

[54] METHOD OF TREATING CLAY TO IMPROVE ITS WHITENESS

[75] Inventors: Raymond H. Young; Horton H. Morris, both of Macon; Robert L. Brooks, Gordon, all of Ga.

[73] Assignee: Freeport Kaolin Company, New York, N.Y.

[21] Appl. No.: 411,588

[22] Filed: Aug. 25, 1982

[51] Int. Cl.³ ............................................... B03B 1/00
[52] U.S. Cl. .................................... 209/5; 209/166
[58] Field of Search .................. 209/3, 5, 9, 166, 167

[56] References Cited

U.S. PATENT DOCUMENTS

| | | | |
|---|---|---|---|
| 2,569,680 | 10/1951 | Leek | 209/10 |
| 2,740,522 | 4/1956 | Aimone et al. | 209/166 |
| 2,894,628 | 7/1959 | Duke | 209/166 |
| 3,224,582 | 12/1965 | Iannicelli | 209/166 |
| 3,337,048 | 8/1967 | Mercade | 209/5 |
| 3,353,668 | 11/1967 | Duke | 209/10 |
| 3,439,802 | 4/1969 | Mallary | 209/166 |
| 3,450,257 | 6/1969 | Cundy | 209/5 |
| 3,536,264 | 10/1970 | Helton et al. | 209/5 |
| 3,599,879 | 8/1971 | Clark | 241/4 |
| 3,736,165 | 5/1973 | Sawyer | 209/5 |
| 3,744,630 | 7/1973 | Smith | 209/166 |
| 3,827,556 | 8/1974 | Mallary | 209/166 |
| 3,861,934 | 1/1975 | Mallary et al. | 209/5 |
| 3,913,742 | 10/1975 | Laapas | 209/167 |
| 3,974,067 | 8/1976 | Nott | 209/3 |
| 4,186,027 | 1/1980 | Bell et al. | 209/5 |
| 4,339,042 | 7/1982 | Windle et al. | 209/5 |

*Primary Examiner*—Bernard Nozick
*Attorney, Agent, or Firm*—Fisher, Christen & Sabol

[57] ABSTRACT

A method of treating a clay to remove therefrom titanium mineral impurities comprising the steps of mixing an aqueous slurry of said clay having a high solids content with an activator and a collector for the titanium mineral impurities; conditioning the aqueous clay slurry at said high solids content for a time sufficient to dissipate therein at least 25 horsepower hours of energy per ton of solids; adding to the conditioned aqueous clay slurry a polyacrylate salt deflocculant; subjecting the conditioned aqueous clay slurry undiluted containing the polyacrylate salt deflocculant to a froth flotation process and removing the titanium impurities with the froth; and recovering clay having a reduced titanium minerals impurities content.

19 Claims, No Drawings

4,492,628

METHOD OF TREATING CLAY TO IMPROVE ITS WHITENESS

BACKGROUND OF THE INVENTION

1. Field of the Invention

The present invention relates to a method of treating clay to brighten it by the removal of discoloring impurities, in particular titanium mineral impurities; e.g. $TiO_2$ impurities, and more particularly relates to a highly efficient method involving the use of froth flotation procedures and oxidizing and reducing bleaches as well as a polyacrylate salt deflocculant employed at the most effective point in the method.

2. Prior Art

Kaolin clay as mined is impure, being mechanically associated with a variety of other minerals. Pure kaolinite is a hydroxyl-containing aluminosilicate mineral and is comprised of the elements hydrogen, oxygen, aluminum, and silicon. In kaolin clay, in addition to these elements, there are other elements of which carbon, magnesium, calcium, sodium, potassium, iron, and titanium are but a few of the two dozen or so elements that can be detected by chemical analysis. If pure kaolinite is colorless, the observed discolorations in kaolin must be attributed to the impurity elements that are found either in an inorganic or organic form with the clay. These very finely divided discoloring impurities greatly detract from the value and usefulness of the clay for many applications such as in the making of high quality paper, where a pigment that has a high brightness and whiteness is required. Impure titanium dioxide ($TiO_2$) is recognized to be an extremely important discoloring impurity in kaolin; presumably iron becomes incorporated into the crystalline lattice of the anatase and rutile forms of titanium dioxide to give a highly colored pigment. As little as 1% iron or less in anatase or rutile will render it highly colored. As used herein, the term "titanium dioxide" refers to the impure form of anatase and rutile.

Processes for separating and concentrating ores and minerals into components have included two general approaches; direct chemical attack on one or more of the components of the minerals and physical processes that achieve selective separation of one or more of the components from the minerals and ores. With kaolin, direct chemical attack has not proven to be completely effective and economically feasible. Conventional bleaching processes employing weakly acidic, strong reducing conditions limit the brightness gain for kaolin clay, since the $TiO_2$ content remains essentially unaffected.

Various methods of physically separating and concentrating minerals and ores are known in the art, including froth flotation systems. A prerequisite of all such methods is that the feed material be crushed or ground to a degree of fineness such that mechanical interlocking between the various mineral components present has been eliminated. Component separation of the mineral and ores can then be performed by preparing a slurry or suspension of the clay in water with the aid of dispersing agents. The prior art on froth flotation processes calls for adjusting the pH of the slurry to either an acidic or alkaline pH value, adding a collector, conditioning the slurry for a time to dissipate energy into the clay, adding frothing agents to the conditioned slurry, diluting the slurry to low solids, increasing the pH above 8, and passing air through the slurry. A modification of the conventional practice of froth flotation is commercially called "Ultraflotation" and comprises adding a finely divided carrier mineral such as calcite to a clay flotation feed and then subjecting the mixture to froth flotation.

The conventional flotation processes have certain inherent disadvantages among which are:

(1) The dispersed feed slurry is best treated at relatively low solids content of 20% by weight, or even 10% by weight or less; hence leading to a large volume of slurry processed per ton of dry clay. For example, increasing the slurry solids from 10% to 30% results in a 74.1% decrease in the amount of water that needs to be removed to produce one ton of clay. Therefore, high levels of slurry solids give rise to lower water removal costs.

(2) The initial froth product contains about 50% of the feed mineral, as well as impurities, which requires reprocessing to obtain reasonable yields of product—four stages of flotation being frequently required.

(3) It is critical that all traces of the carrier mineral, if used, be removed from the beneficiated mineral since the presence of the carrier mineral would be deleterious in the final product.

In some instances in the past, wherein froth flotation has been employed as a part of methods of treating clay to remove color impurities such as titanium mineral impurities, the resulting clay still lacked sufficient brightness. In other instances additional purification techniques such as ultra-flotation techniques employing fine mineral particles (U.S. Pat. No. 3,337,048) or magnetic separation (U.S. Pat. No. 3,974,067) techniques were required for the purpose of achieving an adequate brightness in the treated clay. Such additional processing techniques introduced additional costs and energy consumption. For example, in ultraflotation not only are costs incurred in adding the finely divided mineral particles but costs are also incurred in removing the particles subsequent to froth flotation. The addition and removal of the finely divided particles also results in higher energy consumption. U.S. Pat. No. 3,974,067 illustrates that the addition of a water soluble salt of polyacrylic acid before or during conditioning but not after conditioning and before flotation results in a treated clay which requires the application of further purification techniques in the nature of magnetic separation in order to provide a treating clay of sufficient brightness.

U.S. Pat. No. 2,569,680 to Leek discloses a flotation process for whitening clay which involves treating the clay slip with soda ash and sodium silicate and renders the resulting mixture slightly acid with HCl. The soda ash is intended as a deflocculating agent and sodium silicate is primarily added as a depressant although it is stated that it also assists in deflocculating the clay. The mixture is conditioned and oleic acid is added as collector as well as a flotation agent comprising an emulsion of a fatty acid and a fatty acid amine. The oleic acid is added and the slip is subjected to flotation in which an amyl alcohol mixture is added as frothing agent. The Leek patent, however, fails to disclose or suggest the use of water soluble polyacrylate salt or silicate deflocculants after conditioning and before flotation. Moreover, the patent fails to disclose or suggest the use of an oxidizing bleach before conditioning and a reducing bleach after flotation.

It is also common in some prior art procedures to adjust the pH of the clay slip prior to or during flotation by the use of alkaline agents such as ammonium hydroxide which might be considered to be a deflocculant although not nearly of the nature of silicate and polyacrylate salts.

Other patents such as U.S. Pat. No. 2,740,522 disclose the use of polyacrylate salts such as sodium polyacrylate or ammonium polyacrylate having molecular weights of 10,000 and more and as high as 500,000 molecular weight for the purpose of slime depression. Materials of this type have been known to be strong flocculants when used in the soil conditioning fields but have also been found to be useful in depressing slimes or gangues during the flotation of ores. The patent teaches the addition of polyacrylate salt slime depressants before or during conditioning thus leading the skilled worker away from the present invention in which it is critical to add the polyacrylate salt dispersant after conditioning and before completion of flotation. The patent fails to mention or address itself to the treatment of any clay material. There is no disclosure or suggestion of a clay treatment process which utilizes an oxidizing bleach prior to conditioning and flotation and a reducing bleach after conditioning and flotation. Furthermore, there does not appear to be any disclosure of the use of activating agents. U.S. Pat. No. 3,224,582 uses polyacrylate solid particles during froth flotation for the purpose of acting as collector particles to assist in mechanically stabilizing the foam.

In U.S. Pat. No. 3,599,879 a polyacrylate salt is added to a clay slip during but not after conditioning. Furthermore, the clay slip is diluted after conditioning and before flotation and such dilution results in undesirable energy consumption not only in providing the water for dilution but in removing it when it is desired to isolate or concentrate the clay product. Many other patents including U.S. Pat. Nos. 3,337,048, 3,353,668, 3,450,257 and 3,744,630 all require dilution of the clay slip after conditioning and before flotation. None of the patents mentioned avoid the dilution step resulting in conserving energy.

SUMMARY OF THE INVENTION

We have discovered a froth flotation process whereby clays containing up to 70% by weight of particles smaller than 2 micrometers e.s.d. (equivalent spherical diameter) can be refined to produce high brightness products having low levels of $TiO_2$ impurities. The equivalent spherical diameter for the particles is measured with a Micromeritics Sedigraph 5000 particle size analyzer.

The novel method comprises the steps of:

(1) preparing an aqueous dispersion of clay having a solids content of at least 20% by weight and adjusting the pH of the slurry to a value between 6 and 7;

(2) optionally, adding an oxidative bleach to the slurry and allowing the reaction to proceed for at least about 15 hours;

(3) adding a water soluble salt of a metal activator having a metal chosen from the alkaline earth metals or the heavy metals, and a collector for the titanium mineral impurities;

(4) conditioning the clay slurry at a solids content of at least 20% by weight for a time sufficient to dissipate therein at least 25 HPH of energy per ton of clay solids and allowing the temperature of the slurry to increase without regulation;

(5) mixing a polyacrylate salt dispersing agent to the conditioned slurry, and (6) subjecting the conditioned slurry to froth flotation, removing titanium impurities with the froth and recovering clay having reduced titanium impurity content.

In general the aqueous dispersion of the clay feed contains at least about 20% solids preferably from about 25% to about 70% solids. A solids content of about 30% to about 40% is more preferred. The feed is prepared in the conventional manner by agitating the clay with water and a dispersing agent, e.g. preferably sodium silicate dispersant compositions. Normally 0.05 to 0.5 percent by weight of the dispersing agent is used, based on the weight of dry feed.

The dispersion is then optionally treated with an oxidative bleach such as sodium hypochlorite, ammonium persulfate, or potassium persulfate; preferably potassium persulfate, which is available commercially under the trade name of "Oxone" from duPont and Co. The amount of oxidative bleach used is between 0.01% and 0.1% by weight based on the dry weight of the aqueous clay feed. The pH of the dispersion is then adjusted by the addition of alkaline reagents to a range of pH 4.5 to 7.0, with a pH of 6 to 7 being preferred. The oxidative bleach is allowed to react for at least about 15 hours, e.g. for 15 to 24 hours, before proceeding in the process. The resulting slurry is preferably screened through a 325 mesh sieve to remove impurities having a particle size larger than 44 micrometers e.s.d. Other oxidizing bleaches can be used including those water-soluble inorganic or organic compounds containing in the molecule readily available oxygen capable of bleaching, such as ammonium, persulfate, potassium permanganate, hydrogen peroxide and the like.

The treated dispersion at a pH of less than 7 has added to it an activator ion, e.g., any of the alkaline earth ions including magnesium, calcium, strontium, or barium or any of the "heavy metal" ions such as ferrous iron, cupric copper, manganous manganese and zinc, in the form of a salt such as a chloride, nitrate, acetate, oxide, or mixtures of salts at a concentration in the range of 0.005% to 0.15% or more by weight of the dry feed (or 0.1 to 3 ppt of solids in the dispersion or slurry) preferably in the range of 0.01% to 0.075% by weight (0.2 to 1.5 ppt of solids in the slurry). An anionic oleophilic collector reagent is also added to the dispersion before conditioning. Such collector reagents include fatty acids having 8 to 20 carbon atoms, oleic acid, linoleic acid, linolenic acid, lauric acid, tall oil, red oil, coconut oil fatty acids, and sulpho-oleic acid. The preferred anionic collector is oleic acid. The collector reagent is added usually in the range of 0.05% to 1.5% by weight of dry feed (or 1 to 30 ppt of solids in the slurry), the preferred range being 0.1% to 0.5% (or 2 to 10 ppt of solids in the slurry).

Conditioning of the aqueous clay slurry is carried out after the addition of the activator ions and the collector. This conditioning is carried out by agitating the mixture of slurry, activator ions, and collector reagent for a period of time in the range of 5 minutes to 180 minutes. About 10 to 120 minutes is usually necessary. For optimum results a high intensity of mixing is preferred, such as that obtained with a "Kady Mill" manufactured by Kinetic Dispersion Corp., Buffalo, N.Y. The conditioning corresponds to an energy input of about 25 to 1000 HPH per ton of dry feed. An especially satisfactory apparatus is disclosed and claimed in copending application Ser. No. 411,505 concurrently filed herewith by F. C. Bacon, Jr. and R. L. Brooks, and entitled "High Intensity Conditioning Mill and Method".

The conditioned aqueous slurry is prepared for flotation by the addition of a dispersing agent belonging to the group of polycarboxylate salts. The preferred dispersant is a polyacrylate salt added in the range of 0.05% to 0.3% by weight of dry feed (or 1 to 6 ppt of solids in the slurry) with 0.15% to 0.25% by weight of dry feed (or 3 to 5 ppt) being the preferred amount. The lithium salt of poly(acrylic acid) is preferred, although the sodium and ammonium salts also work well and the potassium salts or mixtures of any of the above-mentioned salts can also be used. In connection with certain clays, particularly the coarse clays or dilute clay slurries, sodium silicate or polyphosphate salts, can be substituted for some or all of the polyacrylate salt deflocculants added after conditioning and before or during flotation. Acrylate salts having an average molecular weight of 500 to 10,000 (preferably 750 to 2400) are useful as dispersants in this invention.

The high solids conditioned slurry is not diluted for flotation as is done in the prior art procedures. The pH of the conditioned slurry with the added dispersant is adjusted for optimum frothing which is in the range of 6.0 to 8.0; a preferred range is 7.2 to 7.8 for most kaolin clays, however, the pH for flotation is dependent on the original feed.

The preferred method for flotation does not require the addition of frothing aids such as frothing agents used in the prior art. The frothing is preferably conducted in a modified frothing cell having the design shown and described in copending application Ser. No. 411,587 filed concurrently herewith by F. C. Bacon, Jr. and entitled "Froth Flotation Apparatus and Process". The flotation cells commercially produced by the Denver Co. and the Wemco Co. are also available.

The following examples serve to illustrate the flotation of kaolin clay and are given to aid in understanding the invention and should not be construed as limiting the invention. In the examples "ppt" means pounds of the reagent per ton of clay solids. The percent titanium dioxide was determined by X-ray fluorescence (XRF) and brightness was measured according to TAPPI Standard T-646 OS-75. All other parts and percentages are on a weight basis unless specified otherwise. Also, temperatures are on the Fahrenheit scale unless otherwise specified. The term TREP means titanium removal and extraction process pursuant to the invention.

EXAMPLE 1

Comparisons A–E (A.) General:

In each of Example 1 and Comparisons A–E a clay slurry was made from clay mined in the Sandersville area of Georgia. The clay had a particle size range of 50–65% of less than 2 μm e.s.d. in the slurry feed pumped to the plant.

Reagents Used:
Oleic acid: U.S.P. Food Grade
Calcium chloride: Added as a 10% aq. solution
N-brand sodium silicate: Approx. 37.7% solids (aqueous)
Sodium polyacrylate: Approx. 43% solids (aqueous).
 Molecular weight of about 1500.
Pretreatment of Feed:

The clay slurry was treated with 1–3 ppt $N_a$ silicate dispersing agent and then passed through a 250 mesh screen to remove mica, sand and other coarse particles. The slurry was combined with 1 ppt Oxone (E. I. duPont product comprising potassium persulfate.) and the pH adjusted to 6.5 to 7.0 with aqueous NaOH. The nearly neutral slurry is then allowed to stand for approximately 15 to 24 hours before use. This allowed time for the Oxone to operate on any oxidizable material in the crude. After Oxone treatment the pH of the slurry was generally 6.5 to 6.8, the pH at which conditioning should be initiated. (Slurries having a pH value as low as 6.1 have been trepped satisfactorily.)

Conditioning:

The conditioning of the Oxone-treated feed slurry was carried out using 0.5 ppt $CaCl_2$ and 5 ppt oleic acid. The percentage levels are based on the use of anhydrous reagents. Conditioning was done in the Kinetic Dispersion Mill (KADY) using 2500 ml of a pretreated feed. The chemical level must be decided upon and the chemicals measured and ready for addition. The slurry was placed in the KADY mill cell and the impeller lowered into the cell. After lowering the impeller, the KADY mill was started and the reagents were immediately added.

The slurry was allowed to condition 20 minutes and the final temperature was approximately 180° F. The pH after conditioning should be in the range of 6.1 to 6.3.

Removal of Oleic Acid—$TiO_2$ Impurity Complex And Aftertreatment:

The 2500 ml of conditioned slurry was placed in a Denver cell and diluted to 4 liters with tap $H_2O$. The solids were generally in the range of 20–30%. Sodium polyacrylate was added in the amount of 4 ppt as an after-conditioning dispersant. This was allowed to mix into the slurry for a few minutes before frothing was begun. After the polyacrylate addition, dilute HCl was added to lower the pH to a value of 6.2 to 6.5 and the frothing was begun. The Denver cell was operated at 1200 RPM for 45 minutes. As frothing continued, the pH was raised to a maximum value of 7.8 if necessary to improve the removal of impurities. All pH adjustments made during frothing were lowered with dilute HCl (4:1) or raised with dilute $NH_4OH$ (9:1).

After the impurities had been removed, the solids of the slurry were diluted to 10% and the products were isolated. The unfractionated product was flocculated with 10% $H_2SO_4$ and bleached with 15 lbs./ton K-Brite (a commercial form of sodium dithionite). The unfractionated products were filtered and microwave dried.

The TAPPI brightness was measured on a Technidyne S-4 Brightness Tester and the $TiO_2$ analysis determined by X-ray fluorescence.

(B.) Example 1 Showing the Superiority of the Polyacrylate Dispersant Over Other Dispersants, Comparisons A–C, When Added to the Slurry After the Conditioning Stage But Before the Flotation Stage:

In Example 1 and Comparisons A–C the feed slurry used was a 36% solids, Sandersville crude clay, which was a dense compact clay mined from the Cheeves mine and which was dispersed with 2.7#/ton "N" brand sodium silicate.

The feed slurry was conditioned in a KADY mill for 20 minutes using the reagents given in (A.) above. Portions of the conditioned slurry were treated with different dispersants prior to flotation. A control sample was included which contained no added dispersants. The product was isolated by floccing with dilute sulfuric acid to a pH of about 3.0, reductively bleaching the clay with sodium dithionite at a level of 15 ppt, filtering, and drying. The dry sample was analyzed for % $TiO_2$ and GEB was measured on the brightness tester.

The efficiency of the TREP process is measured by the amount of titanium dioxide remaining in the sample after flotation and the amount present in the feed.

The results of this experiment are given in Table I.

TABLE I

Efficiency of Various Dispersants on Flotation

| Ex. No. | Dispersant Description | Dosage (#/ton) | Product % $TiO_2$ | Product GEB | % $TiO_2$ Removal |
|---|---|---|---|---|---|
| — | Feed | — | 1.76 | 84.7 | — |
| A | Control | 0 | 1.12 | 86.0 | 36.4 |
| B | TSPP/$Na_2CO_3$* | 2 | 1.06 | 86.8 | 39.8 |
| C | Na Silicate | 2 | 0.95 | 87.3 | 46.0 |
| 1 | Na Polyacrylate | 2 | 0.53 | 89.1 | 69.9 |

*A mixture of TSPP tetrasodium pyrophosphate and $Na_2CO_3$ at a wt./wt. level of 60 TSPP/40 $Na_2CO_3$ which is a very commonly used dispersant for kaolin clay.

The results show that no significant improvement over the control is obtained with either sodium silicate or the TSPP/$Na_2C_3$ mixture. However, the polyacrylate type of dispersant gave almost a twofold improvement.

(C.) Comparisons D and E Showing the Adverse Effect of Adding a Polyacrylate Type of Dispersant to the Conditioning Stage of the Process:

In these comparisons the feed used was a 38.7% solids slurry of a Sandersville crude clay, which was a sandy crumbly clay from the Harrison mine, and which was dispersed with 2.3 ppt of "N" brand sodium silicate.

These comparisons were carried out to show the adverse effect of polyacrylate dispersants on the conditioning stage. A control (Comparison D) was run which contained no added dispersant during the conditioning stage. The second run (Comparison E) contained 1.7 ppt of sodium polyacrylate dispersant in the feed slurry. The conditioning was accomplished by stirring in a KADY Mill for 20 minutes as described hereinabove.

The flotation stage was carried out in a Denver flotation cell as described above while passing air through the slurry. The product was isolated in the normal manner of flocculating, reductively bleaching, filtering, and drying. The dry samples analyzed for % $TiO_2$ and GEB was measured.

The results of the two Comparisons are given in Table II.

TABLE II

Effect of Polyacrylate Dispersant on Conditioning

| Ex. No. | Description | Dosage (#/ton) | Product % $TiO_2$ | Product GEB | % $TiO_2$ Removal |
|---|---|---|---|---|---|
| — | Feed | — | 1.83 | 85.6 | — |
| D | Control | 0 | 0.53 | 90.9 | 71.0 |
| E | Na Polyacrylate | 1.7 | 1.50 | 87.0 | 18.0 |

The results dramatically show that the addition of a polyacrylate dispersant prior to conditioning is very detrimental to $TiO_2$ removal. A comparison of the results of Example E using $N_a$ polyacrylate salt added before conditioning with the control where no dispersant is used illustrate that the use of the polyacrylate dispersant during conditioning provides only one quarter of the $TiO_2$ removal obtained when no dispersant at all is added during or between conditioning and flotation.

EXAMPLE 2

High Conditioning Chemical Level

A 250 gallon batch of a sodium silicate dispersed kaolin clay from Washington County, Ga. was screened through a 325 mesh screen to give a slurry having a 35% solids content and a particle size of 62% less than 2 $\mu m$. The slurry was treated with an oxidative bleach, potassium persulfate (Oxone) at a level of 1 ppt of dry clay and the pH of the slurry adjusted to 6.7 with a 50 weight percent solution of sodium hydroxide. The total amount of alkali used was 0.24 ppt of dry clay. The total batch of clay slurry was stirred at room temperature for twenty hours before carrying out the conditioning stage.

A small portion of the slurry was flocculated by addition of sulfuric acid to a pH of 3, treated with the reductive bleach, sodium dithionite, at a level of 15 ppt, filtered, and dried giving a clay having a $TiO_2$ content of 1.73% and a Tappi brightness of 83.5. This sample represents a control for the unfractionated clay.

Another portion of the original slurry (i.e. prior to oxidative bleaching) was diluted to 10% solids content and allowed to settle by gravity at a rate of 45 minutes/inch depth of slurry. The decanted fine sized kaolin fraction had a particle size of 92% less than 2 $\mu m$. Treatment with sulfuric acid to a pH of 2.8 caused flocculation and after treatment with sodium dithionite at a level of 10 ppt of dry clay, filtering, and drying the sample analyzed 2.21% $TiO_2$ and had a Tappi brightness of 86.2. This sample represents a control for the fine clay fraction.

| | No Conditioning Or Flotation | |
|---|---|---|
| Clay | % $TiO_2$ | Brightness |
| Unfractionated | 1.73 | 83.5 |
| Fine Fraction | 2.21 | 86.2 |

The conditioning of the oxidized slurry after the addition of calcium chloride and calcium oxide each at a level of 0.05% by weight (1 ppt) and oleic acid at a level of 1.0% by weight (20 ppt) based on dry clay was carried out in a modified high shear mill for a period of 150 minutes which resulted in an input of about 300 horsepower hours per ton of dry clay. The final temperature of the slurry was 137° F. and the pH was 6.9.

The undiluted slurry was transferred to a frothing cell and the lithium salt of a polycarboxylic acid dispersant having a molecular weight of 1500 added in an amount which corresponded to 4 ppt of dry clay. The pH of the warm slurry was maintained in the range of 7.0 to 7.6 by the intermittent addition of ammonium hydroxide. The frothing was accomplished by bubbling air through the stirred slurry for about two hours and raking the dark colored froth from the top of the slurry.

A sample of the slurry product was acidified, bleached with sodium dithionite at a level of 10 lbs per ton of dry clay, filtered, and dried. Analysis of the product showed a $TiO_2$ content of 0.16% which indicates that 90.7% of the highly colored $TiO_2$ had been removed. The Tappi brightness of this unfractionated kaolin was 89.8, an increase of 6.3 brightness points over the brightness of the clay which was not conditioned or subjected to flotation.

A fine sized kaolin product was isolated from a sample of the frothed slurry after flotation by diluting said slurry to 10% solids level and gravity settling at 45 minutes/inch depth of slurry. The fine fraction of the slurry was decanted, acidified to pH 3.0, bleached with sodium dithionite at 10 ppt of dry clay, filtered, dried, and analyzed. The analysis showed a TiO₂ content of 0.21% corresponding to a 90.5% removal of the original TiO₂ level. The Tappi brightness of the fine sized kaolin fraction was 92.0, an increase of 5.8 brightness points.

| | Conditioned And Flotated | | |
|---|---|---|---|
| Clay | % TiO₂ | Brightness | % TiO₂ Removed |
| Unfractionated | 0.16 | 89.8 | 90.7 |
| Fine Fraction | 0.21 | 92 | 90.5 |

EXAMPLE 3

Medium Conditioning Chemical Level

Another slurry of kaolin from Washington County, Ga. was prepared using a sodium silicate dispersant. The pretreatment with potassium persulfate and alkali to a slurry pH of 5.4 was carried out as described in Example 2. The unfractionated and fine fractions were isolated as described in Example 2 and gave the following analysis.

| | No Conditioning Or Flotation | |
|---|---|---|
| Clay | % TiO₂ | Tappi Brightness |
| Unfractionated | 1.71 | 81.6 |
| Fine Fraction | 2.19 | 83.3 |

The conditioning of the slurry was carried out as in Example 2 but with the following levels for the chemical additives; 0.00625% (0.125 ppt) for both the calcium chloride and calcium oxide and 0.125% (2.5 ppt) oleic acid. The conditioning time was 3 hours with an input of 328 horsepower hours/ton of dry clay (HPH). The final temperature was 206° F. and the slurry pH was 5.8. The sodium polyacrylate dispersant having a molecular weight of 1500 was added at a level of 4 ppt of dry clay and the slurry frothed as before at 35% solids content. The frothed products were analyzed giving the results as shown below:

| | Conditioned And Flotated | | |
|---|---|---|---|
| Clay | % TiO₂ | Tappi Brightness | % TiO₂ Removed |
| Unfractionated | .44 | 87.1 | 74.3 |
| Fine Fraction | .67 | 90.6 | 69.4 |

EXAMPLE 4

Low Conditioning Chemical Level

This example again shows possible variation in the level of chemicals which produce satisfactory results through the use of the present flotation procedure.

A kaolin slurry from Washington County, Ga. was dispersed with sodium silicate at a solids level of 35.8% and pretreated with the oxidizing bleach (potassium persulfate) at the level and using the procedures given in Example 2. The slurry pH was adjusted to 6.7. Isolation of unfractionated and fine sized samples was done as described in Example 2 and had the following analyses:

| | No Conditioning Or Flotation | |
|---|---|---|
| Clay | % TiO₂ | Tappi Brightness |
| Unfractionated | 1.67 | 86.3 |
| Fine Fraction | 2.15 | 88.6 |

The conditioning chemicals were added at the following levels: 0.003125% (0.0625 ppt) of calcium chloride and the same percentage of calcium oxide with a level of 0.05% (1 ppt) for the oleic acid. Conditioning in a high shear mill for 2.5 hours resulted in an input of 305 HPH/ton of dry clay. The final slurry temperature was 140° F. and the slurry had a pH value of 6.8. Carrying out the frothing on the undiluted slurry after adding the sodium polyacrylate dispersant in an amount of 4 ppt and having a molecular weight of 1500 gave unfractionated and fine sized kaolin products isolated according to the procedure in Example 2. The products were analyzed and results are given below:

| | Conditioned and Flotated | | |
|---|---|---|---|
| Clay | % TiO₂ | Tappi Brightness | % TiO₂ Removed |
| Unfractionated | 1.00 | 89.3 | 40.1 |
| Fine Fraction | 1.33 | 90.5 | 38.1 |

EXAMPLE 5

This example shows how the said process using ammonium polyacrylate having an average molecular weight of 1500 can be utilized to upgrade other products normally isolated in kaolin beneficiation.

A kaolin feed from Washington County, Ga. was made into a slurry and pretreated as described in Example 2. The unfractionated feed slurry had an adjusted pH of 6.8, a particle size distribution of 61% <2 μm, and a solids content of 35.1%. The control samples were isolated as described in Example 2 and gave the following analyses:

| | No Conditioning Or Flotation | |
|---|---|---|
| Clay | % TiO₂ | Tappi Brightness |
| Unfractionated | 1.73 | 83.5 |
| Fine Fraction | 2.21 | 86.2 |

This feed slurry had added to it a chemical level, based on the weight of dry clay, of 0.00625% (0.125 ppt) for both the calcium chloride and the calcium oxide while the oleic acid was added at a level of 0.125% (2.5 ppt). A modified conditioning unit was run for 3.5 hours during which time the temperature rose from 100° F. to 190° F. The energy for conditioning was calculated to be 381 HPH/ton of dry clay. The conditioned slurry was transferred to a frothing tank and an ammonium polyacrylate having an average molecular weight of 1500 was added at a level of 4 ppt of dry clay to guarantee a well dispersed slurry. The slurry was aerated in a flotation cell for about 3 hours to remove the hydrophobic impurities and then separated in a Tolhurst centrifuge to give approximately a 50% yield of both a coarse and fine fraction having a particle size distribution of 19% and 91% less than 2 μm, respectively.

The analyses for these two fractions were as follows:

| Fraction | Conditioned And Flotated | | % TiO$_2$ Removed |
|---|---|---|---|
| | % TiO$_2$ | Tappi Brightness | |
| Coarse | 0.13 | 86.6 | 92.5 |
| Fine | 0.27 | 91.1 | 87.8 |

The fine fraction corresponds to a No. 1 coating grade clay and was flocculated with sulfuric acid to a pH value of 2.8, bleached with 15 ppt of sodium dithionite, filtered, and dried. The dried cakes were redispersed to form a 70% solids slurry suitable for commercial use.

The coarse fraction was diluted to 35% solids, mixed with an equal volume of styrene-divinylbenzene beads, and delaminated using a cone impeller blade at 1500 RPM for 30 minutes as described in U.S. Pat. No. 3,171,718 issued to Gunn and Morris. The beads used for the delamination were removed by screening the slurry through a 100 mesh sieve. The screened slurry was diluted to 20% solids and allowed to gravity settle at 50 minutes/inch of slurry depth. The particle size of the decanted delaminated product was 81% less than 2 μm e.s.d. The decanted slurry was flocculated with acid, bleached with sodium dithionite at 10 ppt of dry clay, filtered, and dried. The product gave the following analysis:

| Flotation Product | |
|---|---|
| % TiO$_2$ | 0.13 |
| Tappi Brightness | 91.4 |
| Twist Brightness | 95.8 |

The average values for non-flotated, untreated, delaminated clays are about 1.05% TiO$_2$ and about 87-89 Tappi brightness.

EXAMPLE 6

Calcination

The kaolin clays described in the above examples can be dehydroxylated in the temperature range of 1300°-1900° F. to produce clays having properties desirable for certain applications. In order to determine the effect the flotation process described in this invention has on the brightness of calcined products produced by this process, the delaminated, flotated clay product in Example 5 (having 0.13% TiO$_2$, Tappi brightness of 91.4 and Twist brightness of 95.8) was calcined at various temperatures in a muffle furnace for two hours. A control series of calcined products was prepared from non-flotated, untreated, delaminated clay in an identical manner. The results are given in Table III.

TABLE III

| Calcination Temperature (°F.) | Tappi Brightness | (% <2 μm) Particle Size | *Abrasion (mg/10$^5$ revs) |
|---|---|---|---|
| Floated Treated Feed (Ex. 5) | 91.4 | 81.0 | — |
| 1300 | 92.0 | 61.5 | 9 |
| 1500 | 93.9 | 54.5 | 6 |
| 1700 | 95.8 | 47.0 | 9 |
| 1860 | 96.0 | 47.0 | 7 |
| Non-Flotated Untreated Feed | 88 | 82 | — |
| 1300 | 82.5 | 64 | 14 |
| 1500 | 86.5 | 62.5 | 18 |

TABLE III-continued

| Calcination Temperature (°F.) | Tappi Brightness | (% <2 μm) Particle Size | *Abrasion (mg/10$^5$ revs) |
|---|---|---|---|
| 1700 | 91.1 | 60 | 18 |
| 1860 | 93.0 | 58 | 24 |

*Measured on an Einlehner Abrasion Apparatus

The results show the very significant improvement in the Tappi brightness and the lower abrasion of the calcined products prepared from kaolin treated by the process described in this invention. In the floated, treated feeds calcined at 1300° F. to 1860° F., the Tappi brightness increased from 92 (calcination at 1300° F.) up to 96 (calcination at 1860° F.) even though the particle size percentage less than 2 μm fell, that is the products became coarser as the calcination temperature increased. Even more surprising is the finding that abrasion was extremely low and stayed low as the calcination temperature was increased of 1300° F. to 1860° F. This is in direct contrast with the non-flotated untreated clay which increases in abrasion from 14 at 1300° F. to 24 at 1860° F. Clay having an abrasion of 24 mg/10$^5$ revs. is very abrasive and would ruin the doctor knife on a coating machine in a very short time.

EXAMPLE 7

On a production scale, a slurry of clay mined in the Sandersville area of Georgia and having a particle size range of 50 to 65% less than 2 μm is treated with 1 to 3 ppt sodium silicate dispersing agent. The resulting slurry is passed through a 250 mesh screen to remove mica, sand and other coarse particles. The screened slurry is then combined with 1 ppt Oxone (potassium persulfate) and its pH is adjusted to 6.5 to 7.0 with aqueous sodium hydroxide. The resulting slurry is allowed to stand for at least 15 hours, e.g. 15 to 24 hours, to allow the Oxone to operate on oxidizable material in the slurry. At the end of the Oxone treatment the pH of the slurry is about 6.5 to 6.8.

The slurry is heated to about 80° to 100° F. and 0.25 to 0.5 ppt of calcium chloride is added as a 20% aqueous solution. The resulting slurry mixture is pumped into the first of a series of five conditioners having the construction described and claimed in copending application filed concurrently herewith entitled "High Intensity Conditioning Mill and Method", F. C. Bacon, Jr. and R. L. Brooks. Oleic acid in the amount of 1.5 to 2.5 ppt is added to the slurry in the first conditioner and conditioning is conducted with a total residence time of 50 to 120 minutes in the series of five conditioners. The flow rate is so adjusted that the slurry passes out of the fifth conditioner 50 to 120 minutes after it passes into the first conditioner.

After removal from the fifth conditioner the slurry is mixed with 2.5 to 4 ppt of sodium polyacrylate having a molecular weight of 1500 and then pumped into the first of five froth flotation tanks. The pH of the slurry at this point is in the range of 5.5 to 6.5 and its temperature is about 160° to 180° F. The froth flotation tanks are of the type described in copending application filed concurrently herewith by F. C. Bacon, Jr. and entitled "Froth Flotation Apparatus and Process". The residence time of the slurry in passing through the series of froth tanks is 3 to 5 hours which is the time elapsed from the point the slurry enters the first flotation tank until the clay product slurry exits from the fourth flotation tank.

The froth from the first tank is discarded. The product recovered from the bottom of the first flotation tank is fed as feed into the second tank and enough sodium hydroxide is added to raise the pH into the range of 7.2 to 7.8. The pH in this range improves the froth stability since the froth tends to be more unstable at the lower pH's, although in the first tank there are larger quantities of activator and conditioner to offset the foam instability due to acid pH. In addition, the alkaline pH in the second tank assists in removing the oleic acid.

The product from the second tank passes successively into the third and fourth flotation tanks and the product from the fourth tank is passed to product storage or for further treatment. The froths floated off of the second, third and fourth tanks are combined and fed into the fifth flotation tank. These froths are previously watered in the launders of the respective second, third and fourth tanks so that they are dilute solutions. The froth from the fifth flotation tank is discarded and the product from the fifth flotation tank is recycled into the second froth flotation tank.

What is claimed is:

1. A method of treating clay to remove therefrom titanium mineral impurities, said method comprising the steps of:
   (a) mixing said clay in the form of an aqueous slurry having a solids content of clay and said impurities of at least 20% by weight with a collector for the titanium mineral impurities, and an activator for the titanium mineral impurities comprising a water-soluble salt of a metal chosen from the alkaline earth metals and the heavy metals;
   (b) conditioning the aqueous clay slurry at a solids content of at least 20% by weight for a time sufficient to dissipate therein at least 25 horsepower hours of energy per ton of solids at a pH below 7;
   (c) mixing a polyacrylate salt deflocculant with the resulting conditioned aqueous clay slurry after conditioning;
   (d) subjecting the resulting mixture of conditioned aqueous slurry having a solids content of at least 20 wt. % and the polyacrylate salt deflocculant to an air flotation process by passing air bubbles upwardly through the conditioned aqueous slurry and removing titanium mineral impurities with the froth; and
   (e) recovering clay having a reduced titanium minerals impurities content.

2. Method as claimed in claim 1 wherein the first stage of said flotation step (d) is carried out at an acid pH and an alkaline pH is used in succeeding stages of said flotation step.

3. Method as claimed in claim 1 wherein, prior to mixing said clay slurry with said collector and activator, said clay slurry is bleached with an oxidative bleach at a pH of about 6 to about 7.

4. Method as claimed in claim 3 wherein said oxidative bleach is potassium monopersulfate.

5. Method as claimed in claim 3 wherein the polyacrylate salt deflocculant used in step (c) is the sodium salt.

6. Method as claimed in claim 3 wherein the polyacrylate salt deflocculant used in step (c) is the lithium salt.

7. Method as claimed in claim 3 wherein the polyacrylate salt deflocculant used in step (c) is the ammonium salt.

8. Method as claimed in claim 1 wherein said conditioning step (b) is carried out in a conditioning vessel and the resulting conditioned clay slurry is transferred to a froth flotation device wherein steps (c) and (d) are carried out.

9. Method as claimed in claim 8 wherein slurry treated by the froth flotation is removed from the froth flotation device and air is bubbled into the removed slurry which then is recycled to the froth flotation of step (d).

10. Method as claimed in claim 1, wherein said polyacrylate salt deflocculant used in step (c) is the lithium salt.

11. Method as claimed in claim 10 wherein, prior to bleaching said clay slurry is dispersed with a dispersant.

12. Method as claimed in claim 11 wherein said dispersant is sodium silicate.

13. Method as claimed in claim 10 wherein said collector is oleic acid and said activator includes calcium oxide and/or calcium chloride.

14. Method as claimed in claim 10 wherein said collector is oleic acid and said activator is a ferrous compound.

15. Method as claimed in claim 10 wherein said clay contains iron mineral impurities and said activator is a ferrous salt formed in situ by adding a reducing agent in place of some or all of said activator in step (a).

16. Method as claimed in claim 15 wherein said reducing agent is sodium dithionite.

17. Method as claimed in claim 10 wherein, after said froth flotation (d), said slurry is flocculated and bleached with a reductive bleach.

18. Method as claimed in claim 17 wherein said slurry is flocculated with sulfuric acid and said reductive bleach is sodium dithionite.

19. Method as claimed in claim 17 wherein, before flocculation and reductive bleaching, said slurry is allowed to settle and is dewatered by decanting.

* * * * *